Patented Oct. 4, 1949

2,483,598

UNITED STATES PATENT OFFICE 2,483,598

PROTECTIVE COATING COMPOSITION

Charles F. T. Schrank, Avon Lake, Ohio

No Drawing. Application January 4, 1946,
Serial No. 639,161

3 Claims. (Cl. 106—219)

This invention relates to improvements in protective coatings or finishes for surfaces subject to abrasion and to contact with water, and particularly to finishes for floors and floor coverings which must be kept coated with a material which does not become slippery.

One object of the invention is to provide a surface finish which may be applied quickly and easily by the ordinarily available means and without changing the appearance of the initial finish of the surface.

Another object of the invention is to provide a plastic surface finish which is transparent and which will not discolor during use.

Another object of the invention is to provide a protective and dirt-impervious finish for surfaces subject to abrasion and requiring periodic cleaning without affecting the appearance of the protective finish by such cleaning.

Another object of the invention is to provide a coating for floors and floor coverings such as linoleums, which will present a glossy and smooth surface without material change in the coefficient of friction of ordinary footwear with that of the floor before coating, thereby avoiding the slipping of persons thereon.

Another object of the invention is to provide a protective coating for finished surfaces in which the coating may be removed by a combination of ordinary household cleaning agents and by ordinary cleaning methods.

Another object of the invention is to provide a transparent finish for surfaces subject to abrasion and wetting, in which the finish may be readily applied and quickly becomes available for use, which is resistant to discoloration, and which can be cleaned by ordinary methods, and which may be readily repaired, renewed, or removed.

The composition essentially provides a plastic in a vaporizable vehicle with an agent for securing adherence to or wetting of the surface to be protected by the finish. The plastic is a natural or synthetic gum or resin not soluble in the vehicle and is dissolved in a suitable solvent dependent on the character of the gum or resin itself. The vehicle and solution form an emulsion which may be promoted by a suitable material which remains in the finished composition. The emulsion is then broken or plasticized by a material which may be saponifiable, in which case a saponification inhibitor is used. The solution resulting from the broken emulsion is mixed with an agent for securing wetting of the surface to be protected, such wetting agent preferably also having water-proofing qualities. And if the finish is to be exposed to even intermittent contact with water, a material is added for preventing water-spotting.

A typical composition includes:

| Ingredient | Parts by Weight |
|---|---|
| A vaporizable vehicle | 1,000 |
| A mineral salt | 3 |
| An amine | 5 |
| A fatty acid | 20 |
| A solvent for a gum | 56 |
| A gum or resin | 165 |
| An alcohol | 12 |
| An aldehyde | 10 |

It will be understood that the above proportions may be varied dependent on various process factors and on the qualities desired in the finished product. Thus the amount of vehicle determines the density of the composition and its rate of application to the surface. The quantity of gum is adjusted to the amount of vehicle used and the amount of solvent is determined by the quantity of gum used. The quantity of mineral salt determines the rate at which the emulsion is formed. The amount of fatty acid determines the rate at which the emulsion is plasticized or broken and the amount of alcohol is sufficient to inhibit saponification of the fatty acid. The quantity of aldehyde may be adjusted to the particular surface to be coated and the amount of amine may be adjusted to the degree of exposure of the surface to water. Hence, one skilled in the art may vary the above proportions dependent on the use to which the coating is put.

A particular formula which has been found satisfactory in practice is as follows:

| Ingredient | Quantity Used |
|---|---|
| Water _____gallons__ | 140 |
| Borax ($Na_2B_4O_7$) _____pounds__ | 3 |
| Triethanolamine $N(CH_2CH_2OH)_3$ _____gallons__ | ½ |
| Oleic acid ($C_{17}H_{33}COOCH_3$; 10–12° titer) ___do____ | 3 |
| Ammonia solution ($NH_4OH$; 16° Bé.) _____do____ | 7 |
| White shellac (bone dry, wax free) _____pounds__ | 165 |
| Alcohol ($C_2H_5OH$, denatured, 188 proof) _____gallons__ | 1½ |
| Formaldehyde (HCHO) _____do____ | 1½ |

In the above composition, water provides a vaporizable vehicle for shellac, which is the gum, and is soluble in the ammonia. The shellac solution forms an emulsion with the water and the formation of such emulsion is promoted by the use of the borax which is previously dissolved in the water. The emulsion is broken or plasticized by the use of oleic acid, and saponification of such acid is inhibited by the ethyl alcohol which also assists in producing a high gloss of the applied coating. Wetting of the surface to be coated is obtained by adding formaldehyde which also aids in waterproofing the finish. The finish is made resistant to water-spotting by the triethanolamine which remains in the body of the coating.

The composition is prepared by heating 120 gallons of the water to 160-170° F. and dissolving the borax therein. The solution is kept at the above temperature while agitating at a speed of the order of 30 R. P. M., while the triethanolamine, oleic acid, and the ammonia solution (or ammonium hydroxide) are successively added and agitation is continued until thorough mixture of all the above ingredients is secured. The shellac is then added while the above temperature range is maintained and agitation is continued. The shellac dissolves in the ammonia solution and forms an emulsion of dissolved shellac in water, the formation of such emulsion being promoted by the borax and the emulsion is plasticized by the oleic acid so that a clear mixture results.

The entire mixture is then raised to boiling (a temperature of approximately 210° F.). Immediately upon reaching boiling, the heat is shut off and the alcohol is added while agitation is continued for five to ten minutes to secure thorough mixing. The formaldehyde is then added very slowly and with continued agitation to secure thorough mixing as added and to avoid formation of a precipitate clouding of the mixture. Agitation is continued for approximately fifteen minutes whereupon the balance of twenty gallons of water is added. (Division of the water into two parts is merely a matter of using a smaller volume during mixing and reducing the amount of heat required to heat the mixture to the given temperature.) The composition is then cooled to ambient temperature and is allowed to react for three days, after which any precipitate is removed by the decantation of the solution or by filtering out the precipitate. The clear solution is then packed for distribution.

The product obtained from the above process is a translucent solution of a reddish brown color, of a specific gravity of approximately 1.021 and with a slight but pleasant odor. Upon standing, a light flocculent precipitate may form, which is readily dissolved upon agitating the solution. Shaking the finish composition produces a slight foam which, however, soon breaks upon standing.

The finish composition is applied by spreading as a coating of substantially uniform thickness on the surface to be protected, as with a brush, cloth or sponge, and immediately after application presents the appearance of a freshly cleaned surface. The composition is readily washed out of brushes, etc. and off hands with no residue appreciable to the senses, and the composition has no deleterious effects on the person applying the same. Within a period of time, depending upon the rate of evaporation of the water at the time of application of the coating, the finish dries to a transparent, non-tacky surface of high gloss, which is plastic under pressure but resistant to abrasion.

The finish has a coefficient of friction substantially the same as that of an uncoated surface, floor or floor covering, thus preventing slipping of persons walking thereon but permitting dragging of objects thereover without an appreciable increase in the effort necessary when dragging objects over an uncoated surface, floor or floor covering. Such dragging produces only a temporary marring of the gloss of the finish so long as the dragged object is free from points or edges cutting entirely through the finish. Use of the finish on furniture produces a glossy surface highly resistant to wear while preserving the original appearance of the furniture with an increased brilliance and depth of its finish.

Other natural gums or synthetic resins may be used in place of the shellac mentioned provided the proper solvent for such other natural or synthetic material is used and provided that the dissolved gum or resin forms a solution or an emulsion with the particular vehicle used. Mineral salts other than borax may be used to act as a promoter of emulsification. Amines other than the triethanolamine mentioned are articles of commerce and may be used. Any one of the common fatty acids known to the chemical trade and any alcohol which will vaporize at ambient temperatures may also be used. The formula includes formaldehyde but obviously any other wetting agent, and particularly any other aldehyde, may be used, it being desirable, however, that the wetting agent used add to the water-proofing qualities of the finish.

The finish is resistant to cleaning with soap and water either with or without scrubbing, but may be removed by the use of only such quantity of ammonia in the water-soap solution as is necessary to soften the gum. The material may be handled and stored without special precautions. Low temperatures may cause a cloudiness which disappears upon warming of product to ordinary room temperatures.

Although but one embodiment of the present invention has been illustrated and described, it will be apparent to those skilled in the art that various changes and modifications may be made therein without departing from the spirit of the invention or from the scope of the appended claims.

I claim:

1. A protective coating for surfaces comprising 140 gallons of water as a vaporizable vehicle, 165 pounds of shellac to form the body of the coating, 7 gallons of ammonia in water as a solvent for the shellac, the dissolved shellac forming an emulsion in the vehicle, 3 pounds of borax to promote emulsification of the water and shellac-solution mixture, 3 gallons of oleic acid as a plasticizer for the emulsion, 1½ gallons of ethyl alcohol to inhibit saponification of the oleic acid, and 1½ gallons of formaldehyde as a wetting agent for the surface to be coated.

2. A protective coating for surfaces comprising 140 gallons of water as a vaporizable vehicle, 165 pounds of shellac to form the body of the coating, 7 gallons of ammonia in water as a solvent for the shellac, the dissolved gum forming an emulsion in the vehicle, ½ gallon of triethanolamine to make the applied coating resistive to water-spotting in use, 3 pounds of borax to promote emulsification of the shellac, 3 gallons of oleic acid as a plasticizer for the emulsion, 1½ gallons of ethyl alcohol to inhibit saponification of acid, and 1½ gallons of formaldehyde as a wetting agent.

3. A protective coating for surfaces, consisting essentially of 1000 parts of water as a vaporizable vehicle, 165 parts of shellac to form the body of the coating, 56 parts of aqueous ammonia as a solvent for the shellac, the dissolved shellac forming an emulsion in the water, 3 parts of borax to promote emulsification of the water and shellac-solution mixture, 20 parts of oleic acid as a plasticizer for the emulsion, 12 parts of ethyl alcohol to inhibit saponification of the oleic acid, and 10 parts of formaldehyde as a wetting agent for the surfaces to be coated.

CHARLES F. T. SCHRANK.

REFERENCES CITED

The following references are of record in the file of this patent:

UNITED STATES PATENTS

| Number | Name | Date |
|---|---|---|
| 257,456 | Ayling | May 9, 1882 |
| 1,576,663 | Leonard | Mar. 16, 1926 |
| 2,245,100 | Bernstein | June 10, 1941 |
| 2,324,448 | Wehrli | July 13, 1943 |
| 2,385,613 | Davis | Sept. 25, 1945 |

FOREIGN PATENTS

| Number | Country | Date |
|---|---|---|
| 606,042 | France | Feb. 27, 1926 |
| 9,564 | Great Britain | June 29, 1916 |

Certificate of Correction

Patent No. 2,483,598                                            October 4, 1949

CHARLES F. T. SCHRANK

It is hereby certified that error appears in the printed specification of the above numbered patent requiring correction as follows:

Column 4, line 62, for the word "gum" read *shellac*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*